(12) United States Patent
Peers-Smith

(10) Patent No.: US 9,112,675 B2
(45) Date of Patent: Aug. 18, 2015

(54) COMMUNICATIONS SYSTEM

(71) Applicant: Kirintec Limited, Ross-on-Wye (GB)

(72) Inventor: Roy Peter Peers-Smith, Ross-on-Wye (GB)

(73) Assignee: Kirintec Limited, Ross-on-Wye, Herefordshire (GB)

( * ) Notice: Subject to any disclaimer, the term of this patent is extended or adjusted under 35 U.S.C. 154(b) by 0 days.

(21) Appl. No.: 14/245,603

(22) Filed: Apr. 4, 2014

(65) Prior Publication Data

US 2014/0301435 A1 Oct. 9, 2014

(30) Foreign Application Priority Data

Apr. 5, 2013 (GB) .................................. 1306150.2
Jul. 12, 2013 (GB) .................................. 1312534.9

(51) Int. Cl.
| | |
|---|---|
| H03K 7/04 | (2006.01) |
| H04L 7/04 | (2006.01) |
| H04B 1/04 | (2006.01) |
| H04B 1/18 | (2006.01) |
| H04B 15/00 | (2006.01) |

(52) U.S. Cl.
CPC ............... *H04L 7/04* (2013.01); *H04B 1/0458* (2013.01); *H04B 1/18* (2013.01); *H04B 15/00* (2013.01)

(58) Field of Classification Search
CPC .. H04B 10/114; H04B 1/7174; H04B 1/7183; H04B 1/71637; H04B 1/719; H04L 1/002; H04L 25/4902; H04H 20/18; H04H 20/57
USPC .......................................... 375/220, 239, 259
See application file for complete search history.

(56) References Cited

U.S. PATENT DOCUMENTS 5,381,150 A * 1/1995 Hawkins et al. ................. 342/13
5,675,609 A * 10/1997 Johnson ......................... 375/237
6,834,073 B1 * 12/2004 Miller et al. .................... 375/130

FOREIGN PATENT DOCUMENTS

WO  9853337    11/1998
WO  2012168711  12/2012

OTHER PUBLICATIONS

Search Report for EP14163516 dated Jun. 5, 2014.
Search Report for GB1306150.2 dated Oct. 2, 2013.

*Primary Examiner* — Don N Vo
(74) *Attorney, Agent, or Firm* — Andrus Intellectual Property Law, LLP

(57) ABSTRACT

A communications system comprising a signal transmission arrangement for outputting a first signal for transmission, a first controller operable to control transmission of the first signal such that the transmitted signal takes a pulsed form including a plurality of first periods in which the first signal is transmitted separated by second periods in which the first signal is not transmitted, a radio signal receiver arrangement including or forming a bandpass filter and arranged to receive a second signal, and a second controller operable such that during a plurality of third periods the second signal is processed by at least part of the radio receiver arrangement, the third periods being separated by fourth periods in which the radio receiver arrangement does not process the second signal, wherein the first and second controllers are synchronized such that the second periods are synchronized with the third periods, at the radio signal receiver arrangement, such that the pulsed signal received by the receiver arrangement is reconstituted in the bandpass filter into a continuous signal, free or substantially free of interference from the first signal.

22 Claims, 3 Drawing Sheets

COMMUNICATIONS SYSTEM

CROSS REFERENCE TO RELATED APPLICATION

The present application claims priority of British Patent Application No. 1306150.2, filed Apr. 5, 2013 and British Patent Application No. 1312534.9, filed Jul. 12, 2013, the contents of which are incorporated herein by reference in their entirety.

FIELD

This invention relates to a communications system, and in particular to a communications system whereby radio transmissions may be made from or received by a number of co-located, or closely located radio transmitters or receivers with reduced interference therebetween.

BACKGROUND

Where a number of radio systems are used in close proximity to one another, a relatively high power signal transmitted from one of the systems can swamp the signals received by other systems, even where the systems are operating at different transmission frequencies. The resulting desensitisation of a receiver impairs the ability of the receiver to receive and demodulate the incoming signal. Clearly, therefore, in these circumstances, communications difficulties can be faced, for example disrupting the reception of voice communications which may hamper organisation of personnel, or disrupting the reception of transmitted data signals. Depending upon the nature of the signals, the reception of which is disrupted, personnel may be put at unnecessary or avoidable risk.

SUMMARY

It is an object of the invention to provide a communications system whereby interference between closely located equipment is reduced or avoided.

According to the present invention there is provided a communications system comprising a signal transmission arrangement for outputting a first signal for transmission, a first controller operable to control transmission of the first signal such that the transmitted signal takes a pulsed form including a plurality of first periods in which the first signal is transmitted separated by second periods in which the first signal is not transmitted, a radio signal receiver arrangement including or forming a bandpass filter and arranged to receive a second signal, and a second controller operable such that during a plurality of third periods the second signal is processed by at least part of the radio receiver arrangement, the third periods being separated by fourth periods in which the radio receiver arrangement does not process the second signal, wherein the first and second controllers are synchronised such that the second periods are synchronised with the third periods, at the radio signal receiver arrangement.

By way of example, the second controller may be operable to control the second signal received by the receiver arrangement so that the signal takes a pulsed form including a plurality of third periods in which the second signal is received by the receiver arrangement separated by fourth periods in which the radio receiver does not receive the second signal. Alternatively, the signal received by the receiver arrangement may be modified, within the receiver arrangement under the control of the second controller, so that at least part of the receiver arrangement only processes those parts of the second signal received during the third periods.

It has been found that where a pulsed radio signal is passed through a bandpass filter, provided the repetition rate of the pulsed signal is greater than the bandwidth of the filter, any radio frequencies present in the pulsed signal that lie within the filter bandwidth will, in effect, be joined up and emerge from the filter as a continuous, albeit weaker, signal. Any typical radio receiver is, in effect, a tuneable bandpass filter. Accordingly, by transmitting a pulsed signal from the radio transmitter or transmission arrangement, and controlling the operation of the radio signal receiver arrangement in such a manner as to receive only the signal present between pulses of the transmitted signal, the pulsed signal received by the radio signal receiver arrangement can be reconstituted back into a continuous signal free from interference from the radio transmitter simply by the passage of the pulsed, received signal through the radio's bandpass filter. Little modification of a typical receiver is required to allow operation thereof in accordance with the invention. Furthermore, the transmitter used to transmit the received radio signal needs no modification.

The first periods may be equal in length, and the second periods equal in length, thereby defining a fixed pulse rate. Alternatively, the first and/or second periods may be of varying length, thereby defining a variable pulse rate. In either case, the pulse rate is conveniently greater than the bandwidth of the bandpass filter. It is preferably significantly greater than the bandwidth of the bandpass filter, for example it may be several times the bandwidth of the bandpass filter.

The first and second controllers may form part of a single control unit. This is convenient where the transmission arrangement and the radio signal receiver arrangement are adjacent one another. However, this need not always be the case. Provided adequate synchronisation can be maintained, for example by the use of a GPS based timing signal, the transmission arrangement and the radio signal receiver arrangement may be spaced apart. For example, the radio signal receiver arrangement could be a mobile, possibly hand held, unit, capable of use at locations remote from the transmission arrangement.

The technique outline hereinbefore can be extended for use with two or more radio receivers.

BRIEF DESCRIPTION OF THE DRAWINGS

The invention will further be described, by way of example, with reference to the accompanying drawings, in which.

DETAILED DESCRIPTION

Figure 2A:
FIGS. 2a to 2f are diagrammatic representations of waveforms in various parts of the system.
Figure 2B:
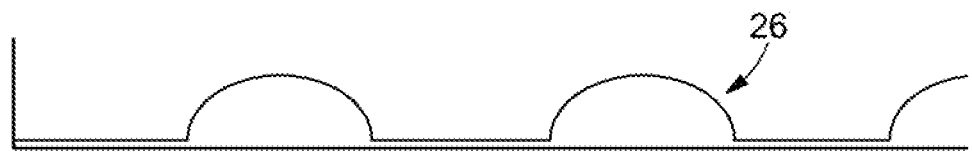
Figure 2C:
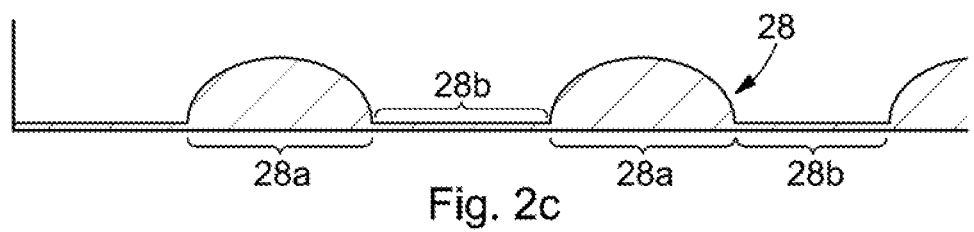

Referring to the accompanying drawings, a communications system is illustrated which comprises a first signal transmission system 10 arranged to output a first signal 14 (see FIG. 2a) for subsequent transmission via an antenna 16. The first signal 14 may take the form of a suitable modulated voice or data signal. A control unit or system 18 is provided which includes a first controller 20 operable to modify the first signal 14 to take a pulsed form. As illustrated, the first controller 20 may take the form of a fast electronic switch 22 operable by a control device 24 in response to a control waveform 26 (see FIG. 2b). The switch 22 operates to modify the signal 14 to take a pulsed form which is passed to the antenna 16 for transmission. Between pulses, the switch 22 diverts the signal from the radio into a suitable load 22b where it is absorbed. An electronic attenuator 22c may also be provided to permit shaping of the transmitted radio pulses and minimise spectral spreading as described below. FIG. 2c illustrates, diagrammatically, the transmitted signal 28, and it will be apparent that the signal 28 is made up of a plurality of first periods 28a in which the first signal 14 is transmitted, separated by second periods 28b in which the first signal 14 is not transmitted. In the second periods 28b, the first signal 14 is absorbed into the load 22b as mentioned above.

Figure 1A:
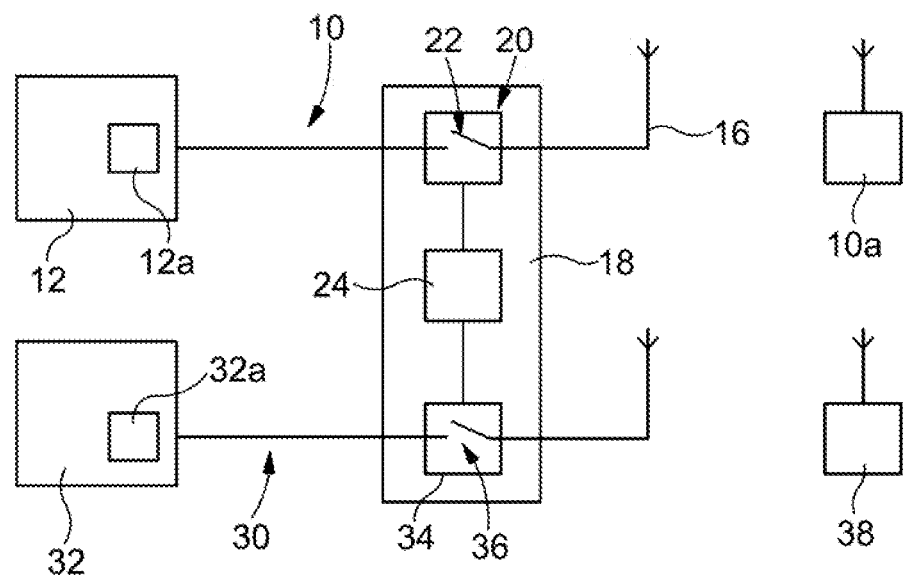
FIG. 1a is a diagrammatic representation of a communication system in accordance with one embodiment of the invention.

Whilst a simple switch 22 is illustrated in FIG. 1a, it will be appreciated that the function thereof may, in reality, be achieved in a number of ways. The switch function may also be integrated into the transmission system 10, as described below.

Figure 2D:
Figure 2E:
Figure 2F:
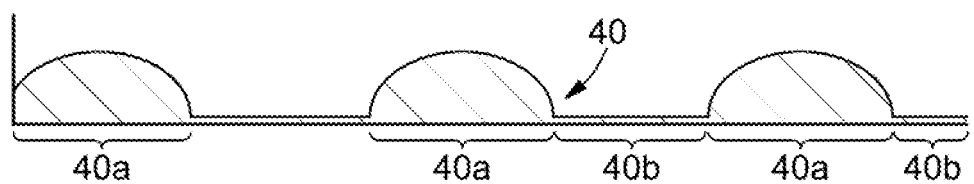

The communications system further comprises a radio signal receiver arrangement 30 including a typical radio receiver device 32 operable to demodulate a received second signal in the usual manner. By way of example, the second signal 38a (see FIG. 2d) may be transmitted from a remotely located transmitter 38. The second signal 38a will typically be at a different frequency to the transmitted signal 28 mentioned hereinbefore. The control system 18 includes a second controller 34 operable to control a switch 36 to modify a received signal in accordance with a control waveform 29 (see FIG. 2e) before the signal is supplied to the device 32. FIG. 2f is a diagrammatic representation of the modified received signal. It will be appreciated that the switch 36 of the second controller is controllable in a manner similar to the switch 22, and that consequently the second signal received by the device 32 (illustrated diagrammatically in FIG. 2f and denoted by numeral 40) is of pulsed form, including a plurality of third periods 40a in which the received radio signal is passed to the device 32 separated by fourth periods 40b in which the received radio signal is not passed to the device 32.

The operation of the control system 18, and the use of the control waveforms 26, 29 in the control thereof, is such that the third periods 40a in which the received signal is passed to the device 32 are synchronised with the second periods 28b in which the first signal is not transmitted. Accordingly, the signal received by the device 32 does not include any component of the first signal.

In addition to the switch 36, the second controller 34 includes a low noise amplifier 44, located upstream of the switch 36, to boost the incoming signal level and so compensate, at least in part, for some of the losses which will be experienced during subsequent parts of the processing. Downstream of the switch 36 is located a fast electronic attenuator 46 to allow shaping of the signal envelope passed to the device 32 (described in further detail below).

The radio receiver device 32 is shown much simplified in FIG. 1a but, in common with other radio receiver devices, it is essentially a bandpass filter 32a tuned to a desired signal frequency followed by a demodulator. It will be appreciated that the signal received by the device 32 is of pulsed form and, as mentioned hereinbefore, where pulsed signals are passed through a bandpass filter, the bandwidth of which is smaller than the pulse rate of the pulsed signal, the filter reconstructs or reconstitutes the signal as a continuous signal which can be demodulated by the device 32 in the usual manner to produce an output substantially the same as the output of a radio receiver receiving the unprocessed signal in the absence of the transmitted pulsed signal.

The switch 36 is ideally of fast acting form, thereby minimising the amount of signal loss whilst ensuring that the first signal is fully removed from the signal passed to the device 32. To further ensure that the first signal is fully removed, the switch 36 should preferably be of high-isolation form.

Figure 3A:
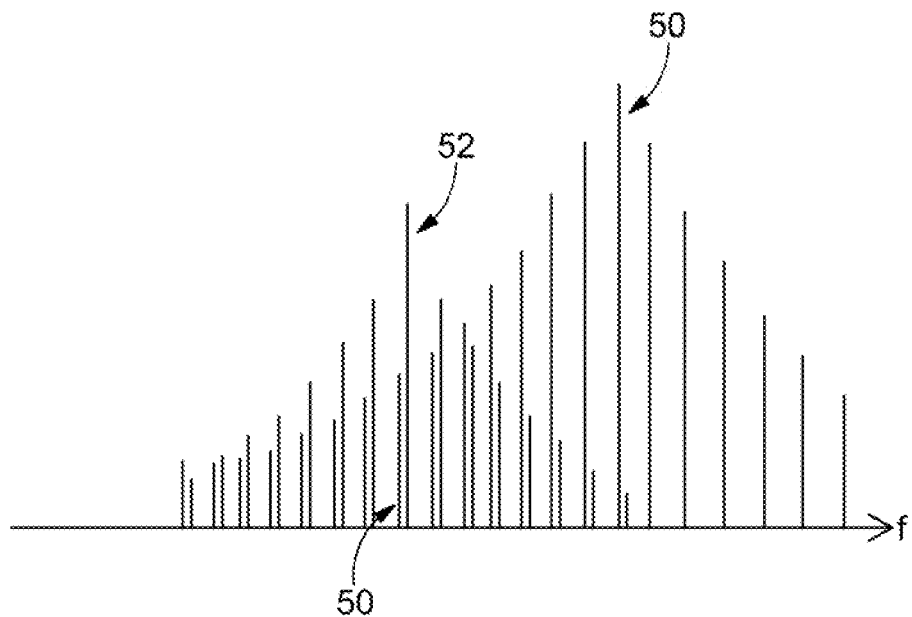
FIGS. 3a and 3b are diagrammatic representations of the effect of the use of a shaped waveform.
Figure 3B:
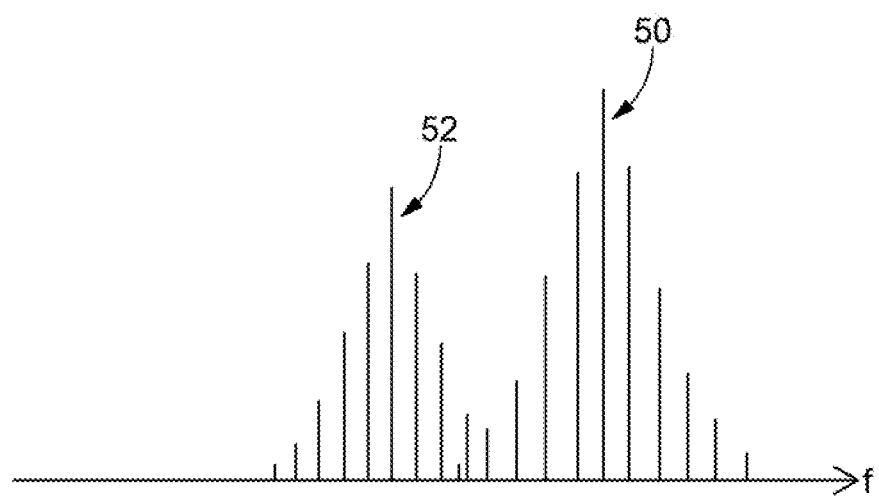

The use of switch 36 alone to divide an incoming radio signal into rectangular pulses will cause spectral spreading, creating numerous weaker images or copies of the radio signal spaced in frequency at multiples of the pulse rate. Thus, as shown in FIG. 3a, a second unwanted radio signal 50 at a frequency other than the frequency of a desired signal 52 entering the switch 36 will give rise to numerous images 50', one of which could fall within the filter bandwidth of the radio receiver 32 and thus cause interference with the desired signal 62. This spectral spreading effect can be minimised, as shown in FIG. 3b, by using the attenuator 46 to smoothly vary the envelope of the pulses supplied to the device 32 so that they are not of sharp, square or rectangular form but rather are of more smoothly curved form. A number of standard mathematical functions, known as window functions, exist to compute the shape of such envelopes to achieve an optimal effect. Similarly, spectral spreading of the pulsed transmission due to the operation of the switch 22 can be minimised by using attenuator 22c to shape the envelope of the transmitted pulses.

Figure 1B:
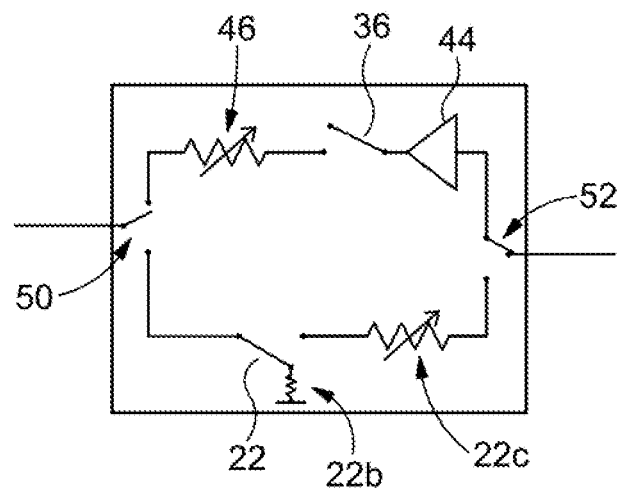
FIG. 1b illustrates parts of the embodiment of FIG. 1a in greater detail.

Whilst in the description hereinbefore the first signal transmission system 10 is described only as being capable of transmitting signals, and the signal receiver arrangement 30 is described only as receiving remotely transmitted signals, in practise it is likely that both will take the form of radio transceivers in which case the first and second controllers 20, 34 may take the form shown in FIG. 1b, including a transmission leg including the switch 22 and a reception leg including the switch 36.

Relays 50, 52 may be provided to control which leg is active at any given time. When it is required to transmit a signal the relays 50, 52 are controlled in such a manner as to take the switch 36 and associated components off-line, and vice versa.

It will be appreciated that the use of the invention allows the reception of radio signals, for example relatively weak signals transmitted from remote locations, despite the use of a transmitter transmitting relatively high power signals in the vicinity of the receiver. The swamping of the received signal from the remote transmitter is thus avoided as desensitisation of the receiver does not occur.

The transmitted signal transmitted by the transmission system 10 can be received and demodulated by a remote receiver 10a in the usual manner, the signal being reformulated into a substantially continuous signal in the manner described hereinbefore, and so can be received and demodulated without requiring modification of the remote receiver 10a.

It will be appreciated that the communications system may be used in the transmission of voice signals or data signals, so long as the radio filter bandwidth is less than the signal pulse rate. It requires no modification to the transmitter used to transmit the subsequently received signal, and requires only limited modification of a typical radio receiver device.

Many of the components in the second controller 34 can be integrated directly into the receive path within radio 32, typically located immediately preceding filter 32a. This arrangement can allow some simplification of the design. For example, relays 50, 52 and bypass path 48 would not be required as the components are no longer in the transmit signal path, and low-noise amplifier 44 is likely to already be present at the front end of any typical radio receiver design. Similarly, many of the components in the first controller 20 can be integrated into the transmit circuitry of the radio 12.

Furthermore, in a software-based radio many of the components can be conveniently implemented in the radio's digital signal processing. Such a radio uses an analogue-to-digital converter to translate the incoming radio signal into a stream of data values that are then filtered and demodulated by a digital processing system. Switch 36 and attenuator 46 could be implemented as a digital multiplier immediately after the analogue-to-digital converter, multiplying each incoming data value by a value X that varies between 0 and 1. During each fourth period X is set to 0 to suppress incoming signal data, and during each third period X is set to 1 to allow signal data through unaltered. X may also be cycled smoothly between 0 and 1 using a mathematical function as described earlier to minimise any co-site interference effects. The resulting bursts of data are joined up by the subsequent digital filters in exactly the same manner as described earlier.

In the description hereinbefore, the controller 18 operates to control the second signal supplied to the radio receiver arrangement 30, removing or attenuating those parts of the received signal received outside of the third periods. In an alternative arrangement, the radio receiver arrangement 30 may be arranged to receive the complete received signal, including the parts received outside of the third periods, avoiding the need to provide the switch 36 and attenuator 46. The radio receiver arrangement 30 may instead be controlled in such a manner that the parts of the second signal received outside of the third periods are ignored by, for example, the final IF filter and/or demodulator of the radio receiver arrangement 30, recovering and demodulating the received signal only during the third periods. Any suitable filtering technique may be used to recover the signal carrier and compensate for the periods during which the second signal is being ignored. A suitable timing signal may be used to control the operation of the controller 18 in such an arrangement.

Such an arrangement would most likely be achieved by appropriate programming of a software based radio device.

Although the description hereinbefore relates to the case where one remotely transmitted signal is to be received in the vicinity of a relatively high power transmission, the invention is also applicable to more complex arrangements or scenarios in which, for example, two or more remotely transmitted signals, transmitted at respective frequencies, require reception and demodulation. This may be achieved simply by controlling each receiver in substantially the manner described hereinbefore, respective controllers being used to modify the received signals to take pulsed form, using the same pulse pattern, to remove the locally transmitted pulsed signal 28 from the received signals such that subsequent demodulation results in the production of the desired substantially continuous waveforms.

For simplicity, in much of the description hereinbefore the transmission system 10 and receiver arrangement 30 are described as having different functions. In reality, as mentioned hereinbefore, each device will typically serve both as a transmitter and a receiver, the control unit controlling the pulsing of the transmitted and received signals in accordance with which of the devices is actually transmitting at any given time. If neither device is transmitting, then the pulsing operation will be redundant and both devices can receive continuously until such time as one or other device needs to commence transmission. If both devices are transmitting simultaneously, then the control unit applies the pulses such that they are out of phase with one another. If desired, three or more transmitters and receivers may be located within the vicinity of one another and, by appropriate adjustment of the phasing of the control waveforms, all may be used simultaneously without the aforementioned signal swamping or deafening issues.

Where individual units are capable of both transmitting and receiving signals, the switches, etc, of the controllers thereof will need to be able to withstand the relatively high transmission power and so may be of relatively complex form. As shown in FIG. 1*b*, separate transmission and reception legs may be provided to accomplish this. However, it may be possible to provide a single, bidirectional leg.

Whilst in the description hereinbefore the controller 18 is described and illustrated as a separate component, this need not be the case and its functionality could be incorporated into the signal transmission arrangement 10 and/or the radio signal receiver arrangement 30. Moreover the controller 18 could be divided into two parts, one controlling the arrangement 10 and one controlling the radio receiver arrangement 30, and will operate correctly so long as the two parts remain synchronised.

The precise timing of the various control pulses described above may be individually adjusted and optimised to compensate for component response times and/or propagation delays in interconnecting cables. Moreover, where the signal transmission arrangement 10 and radio signal receiver arrangement 30 are spaced apart from one another by a significant distance then signal propagation times could result in misalignment of the various timing periods and undesirable inclusion of part of the first signal into the pulsed signal passed to the device 32. Rather than have the control signals exactly synchronised at the point of transmission, it may be preferred to have them slightly displaced from one another to compensate for such propagation delays, so that they are synchronised at the receiver location. If the elements of the system are in fixed locations, then the delays may be fixed and built into the system. Alternatively, particularly if one or other of the elements of the system is mobile, then the GPS system or similar used to maintain synchronisation may also be used to provide position information which can then be used in the calculation of a timing offset by which the pulses are displaced relative to one another to compensate for the spacing of the elements. Alternatively it may be possible to manually adjust the displacement until a clear demodulated signal is received, or to employ an automated adaptive algorithm to monitor the received signal quality and adjust the displacement to maintain optimum performance.

Whilst in the arrangements described hereinbefore the transmitted and received signals use different radio frequencies, the purpose of the invention being to avoid swamping and desensitisation and thereby allowing relatively weak signals to be received and demodulated in the presence of a relatively high power transmission, the invention is also applicable to arrangements in which it is desired to transmit several signals at the same frequency whilst avoiding interference between those signals. In such an arrangement, all of the transmitters and receivers used in the communications system will need to incorporate controllers to allow the conversion of signals, whether for transmission or demodulation, into pulsed forms, correctly synchronised to one another, to extract the required signals from the other signals, such that subsequent filtering and demodulation results in the pulsed signals being converted back into substantially continuous copies of the original signals. As described hereinbefore, the synchronisation should preferably take into account propagation time variations and the like.

The use of this technique would allow a single transmitter to transmit different signals to a series of different receivers using the same transmission frequency.

If the controller 18 is able to accommodate sufficiently fast switching, then the device 10 could be rapidly switched between transmit and receive modes, thereby enabling the transmission of a pulsed signal and, simultaneously, the reception of a pulsed signal. Accordingly, a radio capable of pseudo simultaneous transmission and reception may be possible.

It will be appreciated that a wide range of modifications and alterations may be made to the arrangements described hereinbefore without departing from the scope of the invention as defined by the appended claims. For example, whilst the description hereinbefore relates primarily to the transmission of signals between just two locations, it will be appreciated that the system may be used between more locations than this, provided the second controllers at each location are synchronised, appropriate compensation being made for propagation times, etc.

The invention claimed is:

1. A communications system comprising a signal transmission arrangement for outputting a first signal for transmission, a first controller operable to control transmission of the first signal such that the transmitted signal takes a pulsed form including a plurality of first periods in which the first signal is transmitted separated by second periods in which the first signal is not transmitted, a radio signal receiver arrangement including or forming a bandpass filter and arranged to receive a second signal, and a second controller operable such that during a plurality of third periods the second signal is processed by at least part of the radio receiver arrangement, the third periods being separated by fourth periods in which the radio receiver arrangement does not process the second signal, wherein the first and second controllers are synchronised such that the second periods are synchronised with the third periods, at the radio signal receiver arrangement, such that the pulsed signal processed by the receiver arrangement is reconstituted in the bandpass filter into a continuous signal, free or substantially free of interference from the first signal, the pulsed signal processed by the receiver arrangement having a pulse rate that is greater than a bandwidth of the bandpass filter.

2. A system according to claim 1, wherein the second controller is operable to control the second signal received by the receiver arrangement so that the signal takes a pulsed form including a plurality of third periods in which the second signal is received by the receiver arrangement separated by fourth periods in which the radio receiver does not receive the second signal.

3. A system according to claim 1, wherein the signal received by the receiver arrangement is modified, within the receiver arrangement under the control of the second controller, so that at least part of the receiver arrangement only processes those parts of the second signal received during the third periods.

4. A system according to claim 1, wherein the first periods are equal in length, and the second periods are equal in length, thereby defining a fixed pulse rate.

5. A system according to claim 1, wherein at least one of the first and second periods are of varying length, thereby defining a variable pulse rate.

6. A system according to claim 1, wherein the pulse rate is several times the bandwidth of the bandpass filter.

7. A system according to claim 1, wherein the first and second controllers form part of a single control unit.

8. A system according to claim 1, wherein the first and second controllers are remote from one another.

9. A system according to claim 1, wherein a timing signal is used to maintain synchronisation of the periods.

10. A system according to claim 9, wherein the timing signal is GPS based.

11. A system according to claim 9, wherein a displacement is applied to at least one of the timing signal and synchronisation to compensate for signal propagation times and/or equipment response delays.

12. A system according to claim 11, wherein the displacement is manually applied.

13. A system according to claim 11, wherein the displacement is automatically applied.

14. A system according to claim 1, wherein the pulse signal received by the receiver arrangement is of square or rectangular enveloped form.

15. A system according to claim 1, further comprising means for modifying the shape of the envelope of at least one of the transmitted pulsed signal and the signal applied to the receiver arrangement to reduce spectral spreading.

16. A system according to claim 1, wherein the first signal and the second signal both include voice and/or data signals.

17. A system according to claim 1, wherein the first and second signals are transmitted at the same frequency.

18. A system according to claim 1, wherein the first and second signals are transmitted at different frequencies.

19. A system according to claim 1, wherein the signal transmission arrangement is also capable of receiving signals placed into pulsed form by the first controller.

20. A system according to claim 1, wherein at least one of the transmitter arrangement and receiver arrangement comprises a software-based radio, and at least one of the first and second controllers is implemented within the signal processing functionality of the radio.

21. A system according to claim 1, wherein the transmitter arrangement and the receiver arrangement form parts of a single radio transmitter capable of pseudo-simultaneous signal transmission and reception.

22. A system according to claim 1, wherein the receiver arrangement is capable of transmitting signals placed into pulsed form by the second controller.

* * * * *